(12) United States Patent
Rogers et al.

(10) Patent No.: US 10,348,754 B2
(45) Date of Patent: Jul. 9, 2019

(54) DATA SECURITY INCIDENT CORRELATION AND DISSEMINATION SYSTEM AND METHOD

(71) Applicant: International Business Machines Corporation, Armonk, NY (US)

(72) Inventors: Kenneth Allen Rogers, Stow, MA (US); Allen Hadden, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 14/981,266

(22) Filed: Dec. 28, 2015

(65) Prior Publication Data

US 2017/0187742 A1 Jun. 29, 2017

(51) Int. Cl.
*H04L 29/06* (2006.01)

(52) U.S. Cl.
CPC ...... *H04L 63/1433* (2013.01); *H04L 63/1441* (2013.01); *H04L 63/20* (2013.01)

(58) Field of Classification Search
CPC .. H04L 63/1433; H04L 63/1441; H04L 63/20
USPC .......................................................... 726/1
See application file for complete search history.

(56) References Cited

U.S. PATENT DOCUMENTS

| | | | |
|---|---|---|---|
| 6,678,827 B1 | 1/2004 | Rothermel et al. | |
| 7,376,969 B1* | 5/2008 | Njemanze | G06F 21/55 709/224 |
| 7,877,804 B2 | 1/2011 | Khanolkar et al. | |
| 8,032,557 B1 | 10/2011 | Vijendra et al. | |
| 8,244,777 B1 | 8/2012 | Vijendra et al. | |
| 8,510,446 B1* | 8/2013 | Pai | G06F 21/55 709/203 |

(Continued)

OTHER PUBLICATIONS

Arbor Networks Peakflow X_eng_0, NCERT-Lab-Pubdoc-2011-12-003, Version 1.00, Croatian Academic and Research Network. Twenty-six pages (2011).

(Continued)

*Primary Examiner* — Kambiz Zand
*Assistant Examiner* — Aubrey H Wyszynski
(74) *Attorney, Agent, or Firm* — Jeffrey S. LaBaw; David H. Judson

(57) ABSTRACT

A data security incident correlation and dissemination system and method is disclosed. In an exemplary implementation of the system, a service provider of a managed security service receives incident information regarding data security incidents at different business organizations of the security service. One or more incident managers operated by different organizations send incident information, and a server system within the service provider's network creates aggregated data from the incident information received from the incident managers. The server system analyzes the aggregated data to create correlated incident records that include incident information from related data security incidents at the different organizations, and provides threat intelligence data based on the correlated incident records for the organizations. In embodiments, the server system can "push" threat intelligence data to the organizations, or the organizations can request the threat intelligence data from the server system.

20 Claims, 5 Drawing Sheets

(56) References Cited

U.S. PATENT DOCUMENTS

| | | | |
|---|---|---|---|
| 8,661,062 | B1 | 2/2014 | Jamail et al. |
| 8,707,445 | B2 | 4/2014 | Sher-Jan et al. |
| 8,763,133 | B2 | 6/2014 | Sher-Jan et al. |
| 8,782,784 | B1 | 7/2014 | Bruskin |
| 8,880,682 | B2 | 11/2014 | Bishop et al. |
| 9,069,930 | B1 | 6/2015 | Hart |
| 9,075,668 | B1 | 7/2015 | Hushon et al. |
| 9,083,734 | B1 | 7/2015 | Bishop et al. |
| 9,152,706 | B1 | 10/2015 | Claudatos et al. |
| 9,215,270 | B2 | 12/2015 | Mohaban et al. |
| 9,258,321 | B2 | 2/2016 | Amsler et al. |
| 2007/0180490 | A1* | 8/2007 | Renzi .................. G06F 21/577 726/1 |
| 2010/0325685 | A1* | 12/2010 | Sanbower ............. G06F 21/554 726/1 |
| 2013/0124223 | A1 | 5/2013 | Gregg |
| 2013/0332590 | A1 | 12/2013 | Mohaban et al. |
| 2014/0278664 | A1 | 9/2014 | Loomis |
| 2014/0304822 | A1 | 10/2014 | Sher-Jan et al. |
| 2015/0113663 | A1 | 4/2015 | Sher-Jan et al. |
| 2015/0235164 | A1 | 8/2015 | Key |
| 2015/0242625 | A1 | 8/2015 | Cassidy et al. |
| 2015/0244681 | A1* | 8/2015 | Blumenfeld ........ H04L 63/0421 713/168 |
| 2016/0021133 | A1 | 1/2016 | Sher-Jan et al. |
| 2016/0072836 | A1 | 3/2016 | Hadden et al. |
| 2016/0127394 | A1 | 5/2016 | Hadden et al. |

OTHER PUBLICATIONS

BlackStratus SIEMStorm, "Rapidly identify and resolve threats, . . . " www.blackstratus.com, 2012. Four pages.

Domino Project Management, "Track and Control Projects with Lotus Notes," www.trackersuite.com/index, 2013. Two pages.

HP ArcSight Express, "World-Class Protection for the Mid-Size Organization," www.arcsight.com, 2010. Six pages.

Janet Csirt, "RTIR incident handling work-flow," Janet (UK) WI/JCSIRT/002, jisc.ac.uk, 2011. Eighteen pages.

Jarocki, J., "Orion Incident Response Live CD," 2010, Sans Institute, https://www.sans.org. Forty-five pages.

Khurana, H. et al., "Palantir: A Framework for Collaborative Incident Response and Investigation," IDtrust, 2009. Fourteen pages.

QRadar Administration Guide, http://www.q1labs.com, May 2012. 318 pages.

QRadar Users Guide, http://www.q1labs.com, May 2012. 396 pages.

Reddy, K. et al., "The architecture of a digital forensic readiness management system," Computers & Security 32 (2013) 73-89. Seventeen pages.

Swift, D., "A Practical Application of SIM/SEM/SIEM Automating Threat Identification," 2006, SANS Institute 2007. Forty-one pages.

West-Brown, M. et al., "Handbook for Computer Security Incident Response Teams (CSIRTs)," 2nd Edition, Apr. 2003. 223 pages.

U.S. Appl. No. 14/839,304, filed Aug. 28, 2015, entitled "Incident Response Bus for Data Security Incidents." Specification and drawings, twenty-four pages.

\* cited by examiner

DATA SECURITY INCIDENT CORRELATION AND DISSEMINATION SYSTEM AND METHOD

BACKGROUND OF THE INVENTION

Data security incidents pose a major operational and financial risk for organizations such as businesses and governments. In examples, data security incidents include loss of physical assets, such as a company laptop computer that contains company-confidential information and cyber attacks launched against systems and assets of a company's enterprise network. Any delays when responding to data security incidents such as cyber attacks increases the potential for damage to the organizations and loss of valuable data.

Cyber attacks target security vulnerabilities of computers within an organization's enterprise network. In examples, security vulnerabilities can exist in operating systems of the computers, within software executed by the operating systems, and within data networking systems of the enterprise network. Examples of cyber attacks include actions designed to disrupt normal business operations and intrusion attempts to obtain unauthorized access to the computer systems.

Increasingly, organizations are deploying incident manager (IM) applications to track responses to data security incidents such as cyber attacks.

SUMMARY OF THE INVENTION

Current incident manager (IM) applications will typically manage responses to data security incidents within specific organizations. Though data security incidents of the same type often occur across multiple organizations, current incident manager applications typically cannot disseminate or share responses to data security incidents between organizations such as different business entities. For example, one organization's responses to a Denial of Service (DoS) cyber attack launched in the recent past against a well-known TCP port cannot be applied to a similar cyber attack currently occurring within the enterprise network of a different organization. The effort associated with responding to the data security incident is effectively duplicated within the incident managers, which is inefficient.

The inability for incident managers of organizations to share responses to common data security incidents across different organizations wastes an opportunity to limit the response time and effectiveness of responding to future data security incidents of the same type, in one example. Organizations that are part of the same business sector are often targeted by the same cyber attacks. Sharing this information between organizations would potentially decrease the response time for responding to future cyber attacks for other organizations. An incident management system that enables incident manager applications of different organizations to share incident information of data security incidents and responses to the incidents can also be referred to as a data security incident correlation and dissemination system.

In general, according to one aspect, the invention features a data security incident correlation and/or dissemination system. The system comprises one or more incident managers operated by different organizations and a server system. The server system creates aggregated data from incident information received from the incident managers, analyzes the aggregated data to create correlated incident records that include incident information from related data security incidents at the different organizations, and provides threat intelligence data to the organizations based on the correlated incident records.

Preferably, the server system determines trends among the incident information within the aggregated data, and includes the trends as trends data within the threat intelligence data that the server system sends to the organizations. The server system also anonymizes the threat intelligence data to remove information that identifies the organizations. Typically, the incident information received from the incident managers of the organizations includes the incident information from the data security incidents at the organizations. This may include findings of significance such as indicators of compromise (e.g. hashes of files used by the attacker in carrying out the attack or other) or information about tactics, techniques and tools used by the attackers, in examples.

The incident information received from the incident managers also includes incident response data that includes recommendations and remediation techniques created by the organizations in response to the data security incidents at the organizations.

In one embodiment, the server system provides threat intelligence data to the organizations based on the correlated incident records by sending the threat intelligence data to the incident managers upon request by the incident managers.

The incident information received from the incident managers is typically pushed from the incident managers of the organizations.

The server system can receive sharing and usage information sent from the incident managers of the organizations that specifies rules for sharing the incident information with other organizations. The correlated incident records preferably include metadata that includes the sharing and usage information sent from the incident managers of the organizations.

In one example, the incident information can be used to identify organizations experiencing a similar threat, and to offer a mechanism to bring these organizations together to share information and collaborate on a response to the data security incidents.

According to a preferred embodiment, the server system includes predetermined rules and an analysis engine that compares the threat intelligence data to the predetermined rules, and wherein in response to events within the threat intelligence data matching the predetermined rules, the analysis engine sends the threat intelligence data associated with the matching events to the incident managers of the organizations.

In general, according to another aspect, the invention features a data security dissemination method. The method comprises one or more incident managers operated by different organizations sending incident information, and a server system creating aggregated data from the incident information received from the incident managers. The server system also analyzes the aggregated data to create correlated incident records that include incident information from related data security incidents at the different organizations, and provides threat intelligence data based on the correlated incident records for the organizations.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
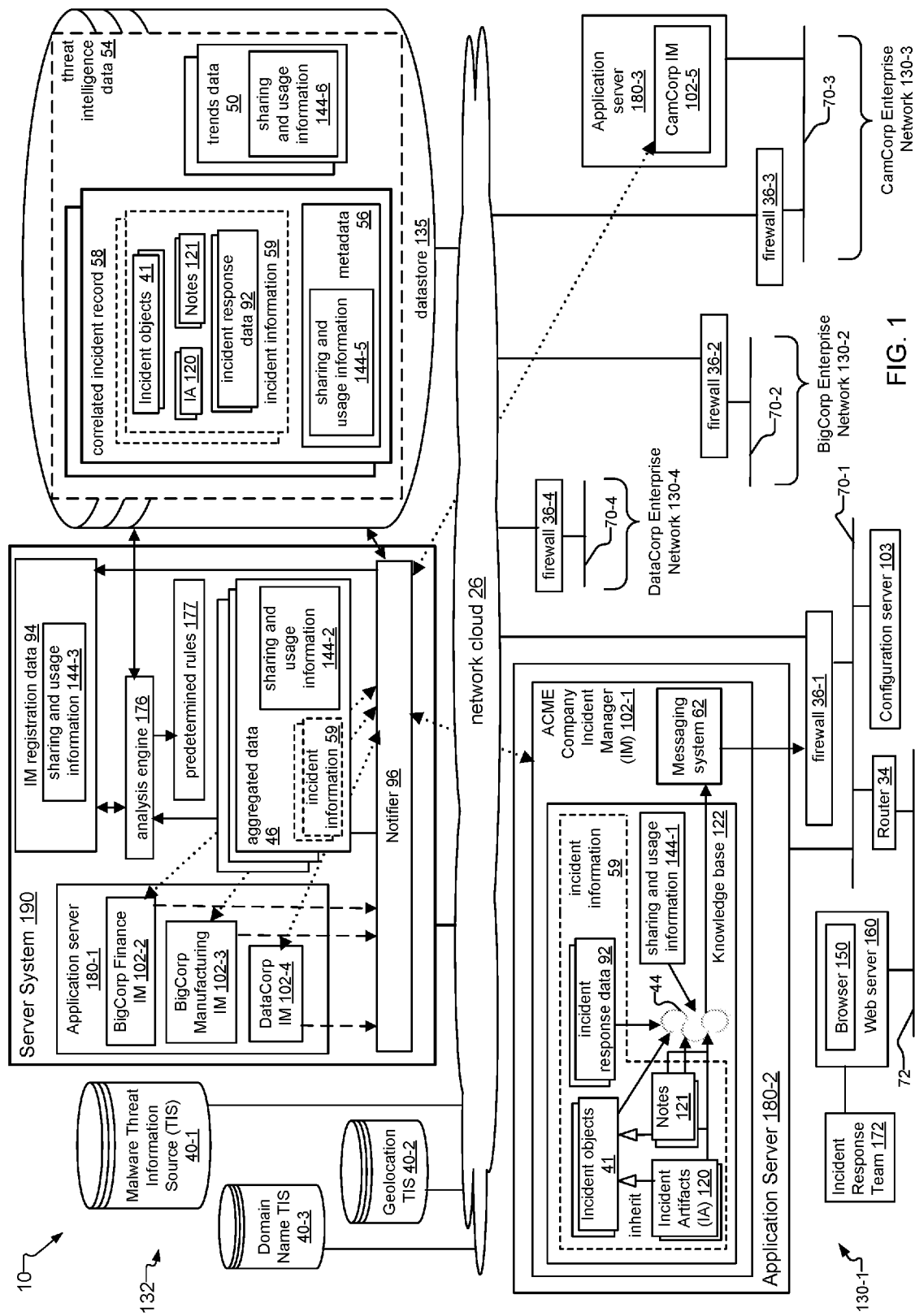
FIG. 1 shows a block diagram of an exemplary data security incident correlation and dissemination system that aggregates and correlates incident information concerning data security incidents from enterprise networks of selected organizations.

FIG. 1 shows an exemplary implementation of a data security incident correlation and dissemination system 10. The system 10 includes a service provider network 132 of a service provider that provides a managed security service to one or more business organizations. The service provider network 132 communicates over a network cloud 26 with one or more enterprise networks 130 of the organizations. In one example, the service provider network 132 and one or more of the organizations are all owned or operated by different business entities.

Enterprise networks 130-1 through 130-4 of exemplary organizations ACME Company, BigCorp, CamCorp, and DataCorp are shown, respectively. Firewalls 36-1 through 36-4 enable communications between corporate networks 70-1 through 70-4 of enterprise networks 130-1 through 130-4, respectively.

The service provider network 132 includes a server system 190 and a datastore 135. Also shown are one or more threat information sources (TIS) 40. Examples include malware, geolocation, and domain name threat information sources 40-1 through 40-3, respectively.

The server system 190 executes queries associated with data security incidents against one or more threat information sources (TIS) 40 to obtain more information about the incidents. The server system 190 saves information based on the data security incidents to the datastore 135. In one example, the server system 190 is an expert system that includes predictive technologies such as artificial intelligence and machine learning capabilities.

The server system 190 includes an application server 180-1, IM registration data 94 and an analysis engine 176. The server system 190 also includes predetermined rules 177, aggregated data 46 and a notifier 96.

Each organization operates one or more incident managers 102 that manage data security incidents detected within the enterprise networks 130 of the organizations. In one implementation, the incident manager(s) 102 are physically located within the service provider network 132 and are implemented as SaaS applications hosted by application server 180-1. In another implementation, the incident manager(s) (102-1) are physically located within the respective corporate networks 70-1. In the illustrated example, incident managers 102-2 and 102-3 manage data security incidents for organization BigCorp's Finance and Manufacturing subnets 72 of BigCorp's enterprise network 130-2, and incident manager 102-4 manages data security incidents for organization DataCorp's enterprise network 130-4. In another implementation, the incident managers 102 are included within the enterprise networks 130 of the organizations themselves. For example, incident manager 102-1 for ACME Company is hosted by application server 180-2 within ACME Company's enterprise network 130-1 and incident manager 102-5 for CamCorp is hosted by application server 180-3 within CamCorp's enterprise network 130-3.

The components within ACME Company's enterprise network 130-1 and that of its incident manager 102-1 are a typical example of components within organizations that communicate with the service provider network 132. The enterprise network 130-1 for ACME Company includes exemplary devices, software and systems that communicate over a corporate network 70 and among one or more subnetworks 72. The subnetworks 72 are segmented from the corporate network 70 via a router 34. Devices include firewall 36-1, router 34, web server 160, and a configuration server 103. The web server 160 includes a browser 150, which incident response team (IRT) 172 personnel utilize to manage and configure the devices and the incident manager 102-1.

ACME Company's incident manager 102-1 includes a knowledge base 122 and a messaging system 62. The knowledge base 122 stores information associated with data security incidents detected within ACME Company's enterprise network 130-1. The knowledge base 122 includes sharing and usage information 144-1, action conditions 44, and incident information 59. The incident information 59 includes details of the incidents such as incident objects 41, incident artifacts (IAs) 120 and notes 121. The incident information 59 also includes recommended actions and remediation techniques published by the organizations in response to specific incidents, also known as incident response data 92.

When ACME Company's incident manager 102-1 detects that incident information 59 has satisfied/met conditions of the action conditions 44, the incident manager 102-1 includes the incident information 59 in messages. The incident manager 102-1 then sends the messages to its messaging system 62. The messages can include incident information 59 and sharing and usage information 144-1, in examples. The messaging system 62 is implemented as a Java Messaging Service (JMS), in one example. The messaging system 62 can either "push" the messages over the network 26 to the server system 190, or alternatively, the server system 190 can poll or request the messaging systems 62 of each of the incident managers 102 for the messages, in examples.

When ACME Company's incident manager 102-1 includes incident information 59 in the messages sent to the server system 102, the incident manager 102-1 can additionally include sharing and usage information 144-1 in the messages. The sharing and usage information 144-1 is associated with the incident information 59 and indicates whether the incident information 59 can be shared with other organizations. The sharing and usage information 144-1 specifies rules and/or policies (e.g. access control lists) for disseminating the incident information 59 among the organizations. The server system 190 receives the messages from the incident managers 102 of the organizations, and uses the sharing and usage information 144 in the received messages as the basis for subsequent sharing and usage policy in data that the server system 190 creates in response to receiving the messages.

The notifier 96 receives the messages from the incident managers 102 and creates aggregated data 46 from the messages. Each record of aggregated data 46 includes incident information 59 and optionally sharing and usage information 144-2. The analysis engine 176 can also process the messages received by the notifier 96 and create IM registration data 94 that includes sharing and usage information 144-3.

The server system 190 stores threat intelligence data 54 to datastore 135. Threat intelligence data 54 includes correlated incident records 58 and trends data 50. In a preferred embodiment, the server system 190 via its notifier 96 receives incident information 59 and sharing and usage information 144 that are pushed from each of the incident managers 102. In an alternate implementation, the server system 190 via its notifier 96 can request or poll the incident managers 102 for the incident information 59 and sharing and usage information 144.

The analysis engine 176 analyzes the records of aggregated data 46 to determine correlations or similarities among the records of aggregated data 46. For each correlation found, the analysis engine 176 creates a separate correlated incident record 58 that includes the incident information 59 from the aggregated data 46 records determined to have correlations or similarities. The sharing and usage information 144-5 associated with the incident information 59 is stored within metadata 56 of each correlated incident record 58.

The analysis engine 176 then determines trends among the incident information 59 within the correlated incident records 58, and includes the trends as trends data 50 within the threat intelligence data. If the correlated incident records 58 include sharing and usage information 144-5 in its metadata 56, the analysis engine includes the sharing and usage information 144-6 within the trends data 50.

In examples, the capabilities provided by the server system 190 can be implemented by a single physical computer system or be distributed across multiple physical or virtual computer systems. In the former example, the server system 190 is a single physical computer system located within the service provider network 132 of the service provider. In the latter example, the server system 190 includes multiple physical computer systems located within the service provider network 132 and one or more virtual computer systems, where the virtual computer systems are third party cloud based services that the service provider accesses via the network cloud 26. In this way, processing associated with the aggregation, correlation, and dissemination of information based on incident information 59 of data security incidents can be shared or distributed across the one or more physical or virtual computer systems of the notional server system 190.

Figures 2A, 2B:
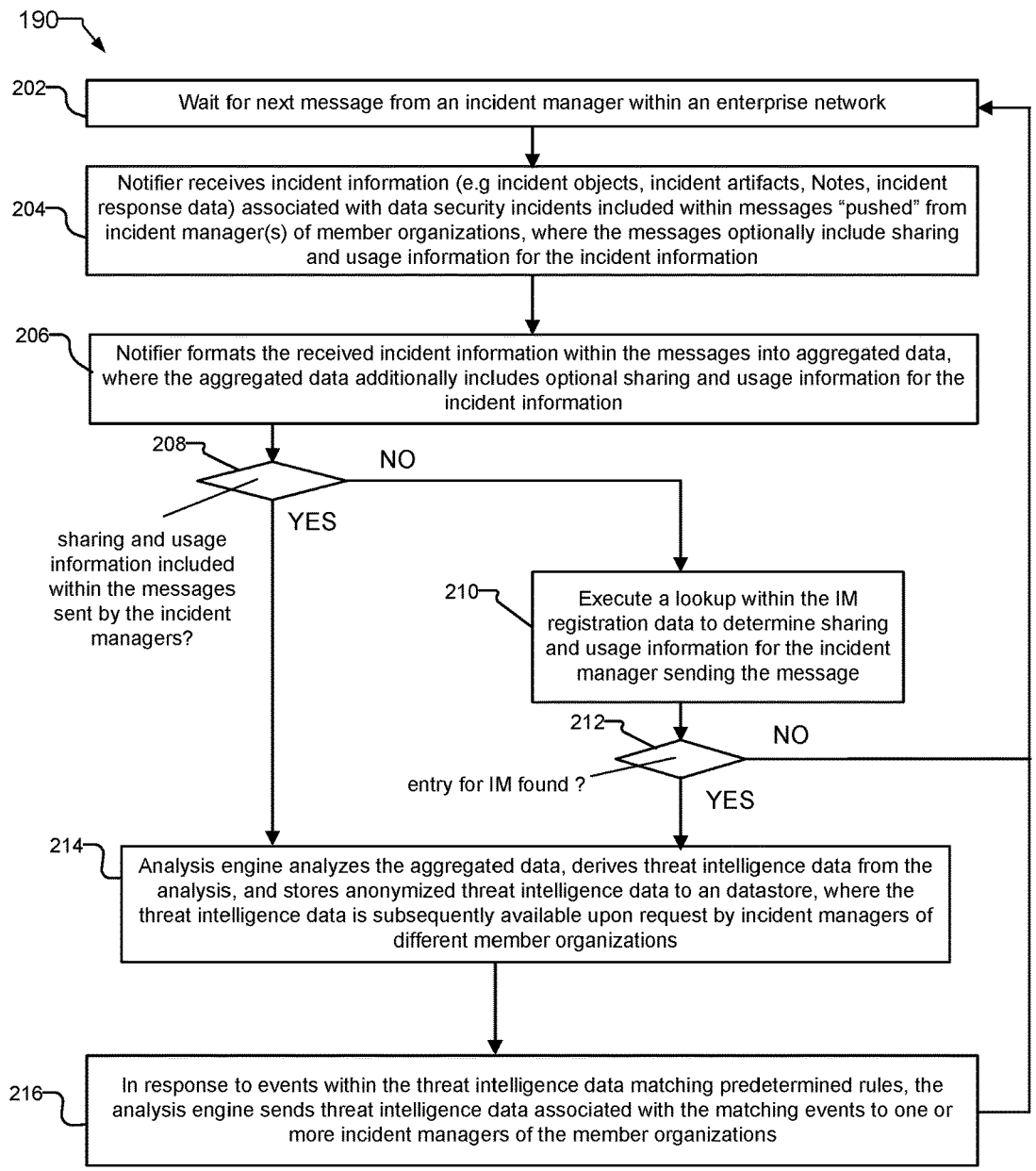
FIG. 2A is a flow chart that describes a method of operation of a server system of the data security incident correlation and dissemination system for responding to registration requests from incident managers of the organizations.
FIG. 2B is a flow chart that describes a method of operation of a preferred embodiment of the server system for creating aggregated data from incident information "pushed" from incident managers, and where the method also analyzes the aggregated data, derives and stores threat intelligence data from the analyzed aggregated data, and provides the threat intelligence data to the organizations via their incident managers.

FIG. 2A shows a registration method of the server system 190. The registration specifies the scope of the information sharing to which each organization allows.

In step 196, the notifier 96 receives a registration request from one or more incident managers 102, where the registration request specifies the organizations that each incident manager will share its incident information 59 with, and where the registration request also specifies the scope of the information usage and sharing between the organizations. In step 198, the notifier 96 stores the information in the registration request to IM registration data 94 of the server system 190.

FIG. 2B describes a method of operation of the server system for creating aggregated data 46 for incidents and creating threat intelligence data 54.

In step 202, the server system 190 waits for the next message from an incident manager 102 within an enterprise network 130. In step 204, the Notifier 96 receives incident information 59 (e.g. incident objects 41, incident artifacts 120, notes 121, incident response data 92) associated with data security incidents included within messages "pushed" from incident managers 102 of organizations, where the messages optionally include sharing and usage information 144 for the incident information 59.

According to step 206, Notifier 96 formats the received incident information 59 within the messages into aggregated data 46, where the aggregated data 46 additionally includes optional sharing and usage information 144 for the incident information 59.

In step 208, the notifier 96 tests if any sharing and usage information 144 was included within the messages sent by the incident managers 102. If the result of this test is true, the method transitions to step 214. Otherwise, the method transitions to step 210.

In step 210, the notifier 96 executes a lookup within the IM registration data 94 to determine sharing and usage information 144-3 for the incident manager 102 sending the message. In step 212, the notifier 96 tests if an entry for the current incident manager 102 is found within the IM registration data 94. If no entry is found, the method transitions back to step 202 to wait for more messages sent from incident managers 102. Otherwise, the method transitions to step 214.

In step 214, the analysis engine 176 analyzes the aggregated data 46, derives threat intelligence data 54 from the analysis, and stores anonymized threat intelligence data 54 to a datastore 135, where the threat intelligence data 54 is subsequently available upon request by incident managers 102 of different member organizations.

Upon completion of step 214, the method transitions to step 216. In step 216, in response to events within the threat intelligence data 54 matching predetermined rules 177, the analysis engine sends threat intelligence data 54 associated with the matching events to one or more incident managers 102 of the organizations.

Figure 3:
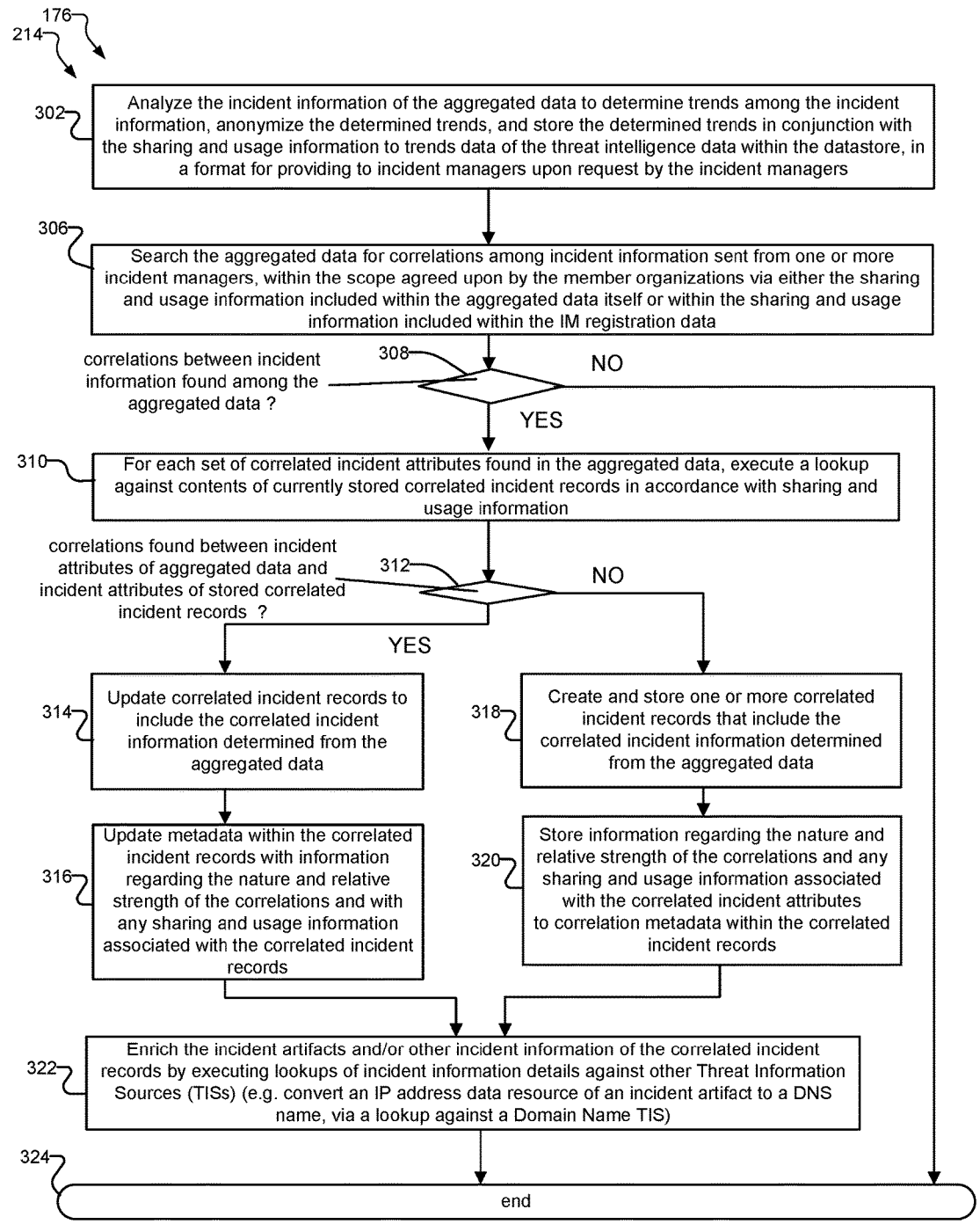
FIG. 3 and FIG. 4 are flow charts that provides more detail for the flow chart of FIG. 2B.

FIG. 3 is a flow chart that provides more detail for step 214 of FIG. 2B.

In step 302, the analysis engine 176 analyzes the incident information 59 of the aggregated data 46 to determine trends among the incident information 59. The analysis engine 176 anonymizes the determined trends, and stores the determined trends in conjunction with the sharing and usage information 144 to trends data 50 of the threat intelligence data 54 within the datastore 135. Preferably, the trends data 50 is stored in a format for providing to incident managers 102 upon request by the incident managers 102.

In an alternate implementation, the analysis engine 176 can "push" the trends data 50 to the incident managers 102 of the organizations in an unsolicited fashion. Regardless of the method in which the trends data 50 is provided by the server system 190 to the incident managers 102, the included sharing and usage information 144-6 specifies rules and/or the policies for disseminating the trends data 50 among the organizations.

According to step 306, the analysis engine 176 searches the aggregated data 46 for correlations among the incident information 59 sent from one or more incident managers 102, within the scope agreed upon by the organizations. This sharing scope is provided via either the sharing and information 144-2 included within the aggregated data 46 or within the sharing and information 144-3 included within the IM registration data 94.

Then, in step 308, the analysis engine 176 determines if any correlations between incident information 59 were found among the aggregated data 46. If the result of this test is true, the method transitions to step 310 to continue processing. Otherwise, the method transitions to step 324 to end processing.

In step 310, for each set of correlated incident information 59 found in the aggregated data 46, the analysis engine 176 executes a lookup against the contents of any currently stored correlated incident records 58 in accordance with its usage and sharing information 144-5. If any correlations were found between incident information 59 of aggregated data 46 and incident information 59 of any stored correlated incident records 58, the method transitions to step 314. Otherwise, the method transitions to step 318.

In step 314, the analysis engine 176 updates the correlated incident records 58 to include the correlated incident information determined from the aggregated data 46. Then, in step 316, the analysis engine 176 updates metadata 56 of the correlated incident records 58 with information regarding the nature and relative strength of the correlations and with any sharing and usage information 144-2 associated with the correlated incident information 59.

In step 318, the analysis engine 176 creates and stores one or more correlated incident records 58 that include the correlated incident information determined from the aggregated data 46. In step 320, the analysis engine 176 stores information regarding the nature and relative strength of the correlations and any sharing and usage information 144-2 associated with the correlated incident information 59 to correlation metadata 46 within the correlated incident records 58.

Upon completion of both step 316 and 320, the method transitions to step 322.

In step 322, the analysis engine 176 enriches the incident artifacts 120 and/or other incident information 59 of the correlated incident records 58 by executing lookups of incident artifact 120 details against other Threat Information Sources 40 (e.g. convert an IP address data resource of an incident artifact 120 to a DNS name via a lookup against the Domain Name TIS 40-3, in one example). The analysis engine 176 can also append information obtained from the lookup against the threat information sources 40 to the incident artifacts 120 as another way of enriching the incident artifacts 120.

Upon conclusion of step 322, the threat intelligence data 54 is available for incident managers 102 to request. In examples, the incident managers 102 can request the entirety of the threat intelligence data 54, or only subsets of the threat intelligence data 54. In one example, multiple incident managers 102 request only the incident response data records 92 within the incident information 59 of the correlated incident records 58. In the example, IRT 172 personnel can provide narrowing information in the request message such as the IP address of a "known bad" incident artifact 120, with the intention of obtaining all incident response data 92 that other organizations published in response to incidents having the same IP address in their incident artifact(s) 120 and that the server system 190 included in one or more correlated incident records 58. Preferably, the incident response data 92 is stored in a format for providing to incident managers 102 upon request by the incident managers 102.

In response, the server system 190 sends associated incident response data 92 only to those incident managers 102 of the organizations that are authorized to view the incident response data 92. The server system 190 uses the sharing and usage policy information 144-5 stored within the metadata 56 of the correlated incident record 58 from which each incident response data 192 was extracted to authorize the transaction. The method then transitions to step 324 to end processing.

Figure 4:
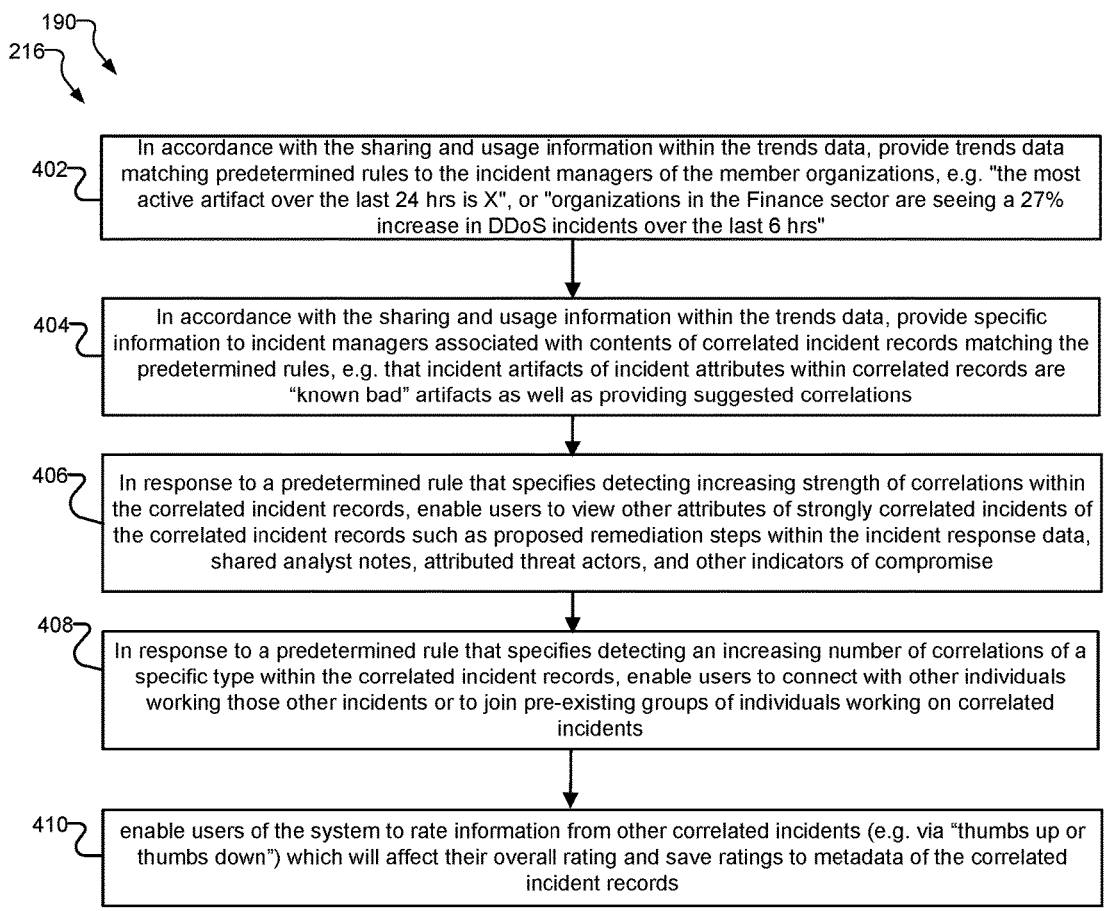

FIG. 4 is a flow chart that provides more detail for step 216 of FIG. 2B. The method of FIG. 4 provides examples of how the analysis engine 176 of the server system 190 analyzes the threat intelligence data 54, and "pushes" relevant portions of the threat intelligence data 54 matching predetermined rules 177 to the incident managers 102 of the organizations.

In step 402, in accordance with the sharing and usage information 144-6 within the trends data 50, the analysis engine 176 provides trends data 50 matching predetermined rules 177 to the incident managers 102, e.g. "the most active artifact over the last 24 hrs is X", or "organizations in the Finance sector are seeing a 27% increase in DDoS incidents over the last 6 hrs," in examples.

According to step 404, in accordance with the sharing and usage information 144-6 within the trends data 50, the analysis engine 176 provides specific information to incident managers 102 associated with contents of correlated incident records 58 matching the predetermined rules 177, e.g. that incident artifacts 120 of incident information 59 within correlated incident records 58 are "known bad" artifacts as well as providing suggested correlations. An example of a "known bad" incident artifact 120 is one that includes data resources such as IP addresses associated with known malware websites and sources.

In step 406, in response to a predetermined rule 177 that specifies detecting increasing strength of correlations within the correlated incident records 58, the analysis engine 176 enables users to view other attributes of strongly correlated incidents of the correlated incident records 58, such as proposed remediation steps within the incident response data 92, shared analyst notes 121, attributed threat actors and other indicators of compromise, in examples.

According to step 408, in response to a predetermined rule 177 that specifies detecting an increasing number of correlations of the same type within the correlated incident records 59, the analysis engine 176 enables users to request to be connected to other individuals working those other incidents or to join pre-existing groups of individuals working on correlated incidents. For example, upon analyzing the incident information 59 in the correlated incident records 58, the analysis engine 176 may determine that a predetermined rule 177 associated with an increasing number of "malware" incidents from the same source IP address is met. In response, the analysis engine 176 can send invitations to the organizations affected by the common malware correlated incident records 59 to participate in a phone conference to share their experiences and propose solutions.

Finally, in step 410, the analysis engine 176 enables users of the system 10 to rate information from other correlated incidents (e.g. via "thumbs up or thumbs down") which will affect their overall rating and save ratings to metadata 56 of the correlated incident records 59. The analysis engine 176 enables this by sending a link (e.g. URL) for a ratings/voting website to the affected organizations, in another example.

Figure 5A:
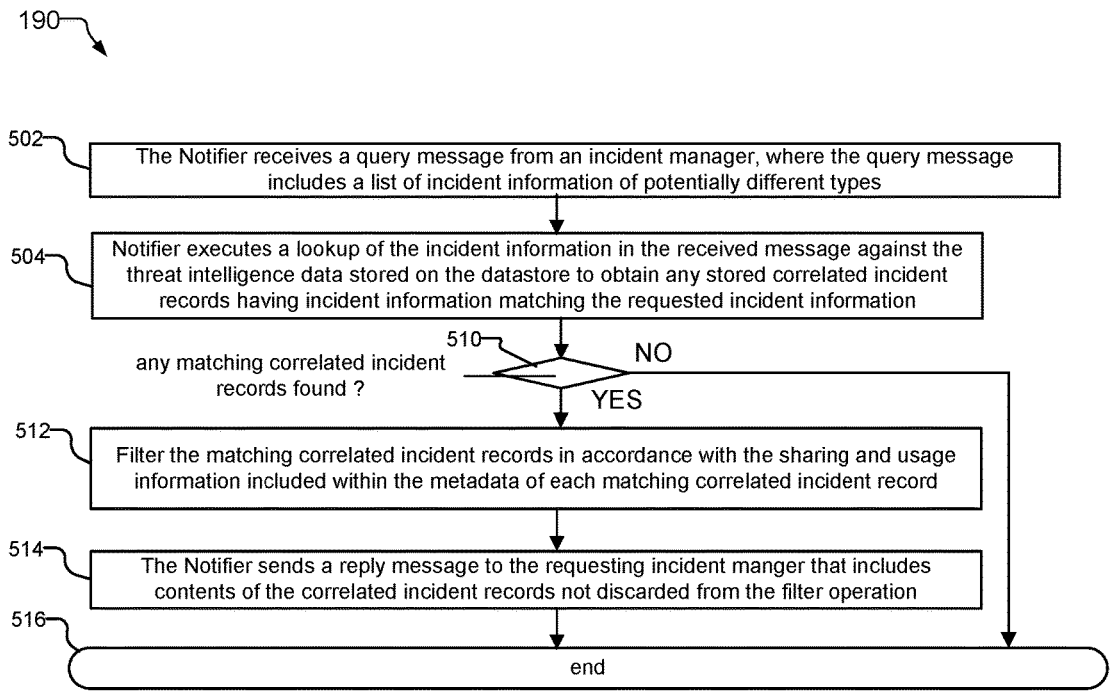
FIGS. 5A and 5B are flow charts that show an alternate embodiment of the server system, with FIG. 5A showing how the server system responds to a request from an incident manager of an organization for threat intelligence data associated with a specific incident, and with FIG. 5B showing how the server system responds to a request from an incident manager of an organization for all trends data of the threat intelligence data over a specific time period.

FIG. 5A shows a method for an exemplary request issued by an incident manager 102 to the server system 190, for threat intelligence data 54 matching a specific set of requested incident information 59.

In step 502, the notifier 96 of the server system 190 receives a query message from an incident manager 102, where the query message includes a list of incident information 59 of potentially different types. Then, in step 504, the notifier 96 executes a lookup of the incident information 59 in the received message against the threat intelligence data 54 stored on the datastore 135 to obtain any stored correlated incident records 58 having incident information 59 matching the requested incident information 59. In step 510, the notifier 96 determines if any matching correlated incident records 58 were found. If this statement is true, the method transitions to step 512. Otherwise, the method terminates at step 516.

In step 512, the notifier 96 filters the matching correlated incident records 58 in accordance with the sharing and usage information 144-5 included within the metadata 56 of each matching correlated incident record 58. The notifier 96, in step 514, sends a reply message to the requesting incident manger 102 that includes contents of the correlated incident records 58 not discarded from the filter operation executed in step 512. The method then terminates at step 516.

Figure 5B:
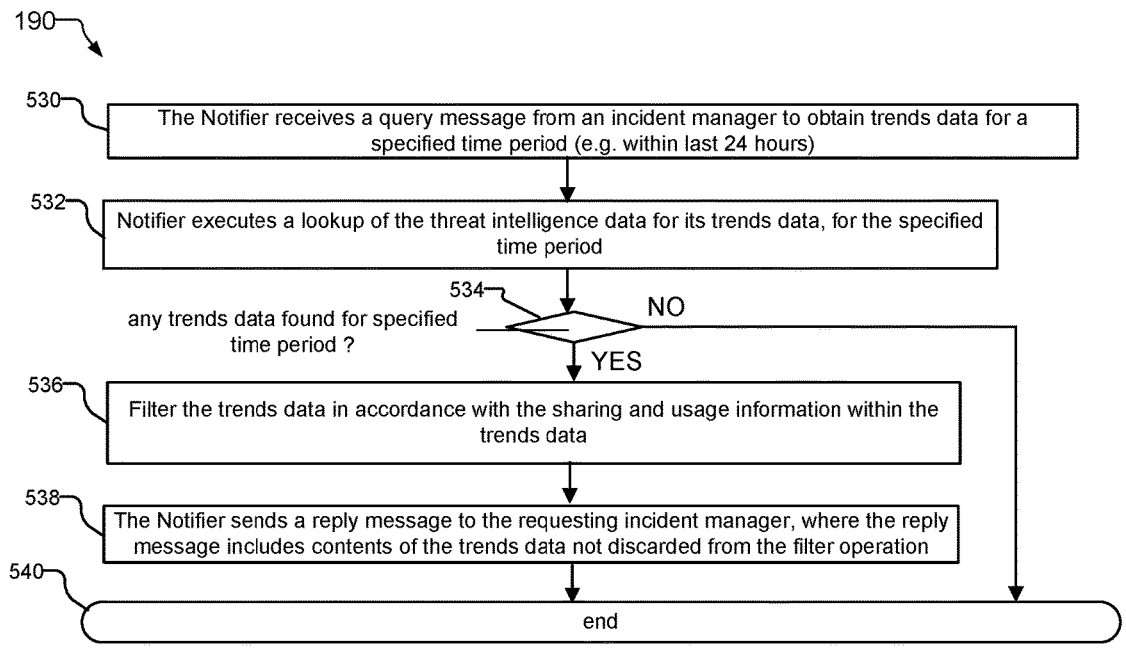

FIG. 5B shows a method for an exemplary request issued by an incident manager 102 to the server system 190, for trends data 50 of the threat intelligence data 54 over a specified time period.

In step 530, the notifier 96 receives a query message from an incident manager 102 to obtain trends data 50 for a specified time period (e.g. within last 24 hours). Then, in step 532, the notifier 96 executes a lookup of the threat intelligence data 54 for its trends data 50, for the specified time period. In step 534, the notifier 96 determines if any trends data 50 for the specified time period were found. If this statement is true, the method transitions to step 536 to continue processing. Otherwise, the method terminates at step 540.

In step 536, the notifier 96 filters the trends data 50 in accordance with the sharing and usage information 144-6 within the trends data 50. According to step 538, the notifier 96 sends a reply message to the requesting incident manager 102, where the reply message includes contents of the trends data 50 not discarded from the filter operation executed in step 536. The method terminates at step 540.

While this invention has been particularly shown and described with references to preferred embodiments thereof, it will be understood by those skilled in the art that various changes in form and details may be made therein without departing from the scope of the invention encompassed by the appended claims.

What is claimed is:

1. A data security incident correlation and dissemination system, the system comprising:
    a server system that creates aggregated data from incident information received from a set of incident managers at least two of which are operated by different organizations, the server system including an analysis engine that analyzes the aggregated data to create correlated incident records that include incident information from data security incidents at the different organizations that have been determined by the analysis engine to be related, at least one correlated incident record being uniquely associated with a correlation found by the analysis engine and including a nature and relative strength of the correlation, and that provides threat intelligence data to the organizations based on the correlated incident records;
    wherein upon detecting that a given number of correlations of a same type within the correlated incident records has occurred and relate to given incident information, the server system is further operative to notify the different organizations that have been affected by the given incident to facilitate a mitigation effort.

2. The system of claim 1, wherein the server system determines trends among the incident information within the aggregated data, and includes the trends as trends data within the threat intelligence data that the server system sends to the organizations.

3. The system of claim 1, wherein the server system anonymizes the threat intelligence data to remove information that identifies the organizations.

4. The system of claim 1, wherein the incident information received from the incident managers of the organizations includes the incident information from the data security incidents at the organizations.

5. The system of claim 1, wherein the incident information received from the incident managers includes incident response data that includes recommendations and remediation techniques created by the organizations in response to the data security incidents at the organizations.

6. The system of claim 1, wherein the server system provides threat intelligence data to the organizations based on the correlated incident records by sending the threat intelligence data to the incident managers upon request by the incident managers.

7. The system of claim 1, wherein the incident information received from the incident managers of the organizations is pushed from the incident managers of the organizations.

8. The system of claim 1, wherein the server system receives sharing and usage information sent from the incident managers of the organizations that specifies rules for sharing the incident information with other organizations.

9. The system of claim 8, wherein the correlated incident records include metadata that includes the sharing and usage information sent from the incident managers of the organizations.

10. The system of claim 1, wherein the server system includes predetermined rules and the analysis engine compares the threat intelligence data to the predetermined rules, and wherein in response to events within the threat intelligence data matching the predetermined rules, the analysis engine sends the threat intelligence data associated with the matching events to the incident managers of the organizations.

11. A data security dissemination method, the method comprising:
    receiving incident information from a set of incident managers at least two of which are operated by different organizations; and
    creating aggregated data from the incident information received from the incident managers, analyzing the aggregated data using an analysis engine to create correlated incident records that include incident information from data security incidents at the different organizations that have been determined by the analysis engine to be related, at least one correlated incident record being uniquely associated with a correlation found by the analysis engine and including a nature and relative strength of the correlation, and providing threat intelligence data based on the correlated incident records to the organizations; and
    responsive to detecting that a given number of correlations of a same type within the correlated incident records has occurred and relate to given incident information, notifying the different organizations that have been affected by the given incident to facilitate a mitigation effort.

12. The method of claim 11, further comprising determining trends among the incident information within the aggregated data, and including the trends as trends data within the threat intelligence data sent to the organizations.

13. The method of claim 11, further comprising anonymizing contents of the threat intelligence data to remove information that identifies the organizations.

14. The method of claim 11, wherein the incident information is generated from data security incidents at the organizations.

15. The method of claim 11, further comprising maintaining incident response data that includes recommendations and remediation techniques created by the organizations in response to the data security incidents at the organizations.

16. The method of claim 11, wherein providing threat intelligence data based on the correlated incident records to the organizations comprises sending the threat intelligence data to the incident managers upon request by the incident managers.

17. The method of claim 11, further comprising receiving sharing and usage information sent from the incident managers of the organizations that specifies rules for sharing the incident information with other organizations.

18. The method of claim 17, further comprising including the sharing and usage information sent within metadata of the correlated incident records.

19. The method of claim 11, wherein in response to events within the threat intelligence data matching predetermined rules, sending the threat intelligence data associated with the matching events to the incident managers of the organizations for providing threat intelligence data based on the correlated incident records to the organizations.

20. The method of claim 19, further comprising sending the threat intelligence data associated with the matching events to the incident managers of the organizations in accordance with sharing and usage information associated with the threat intelligence data.

* * * * *